Sept. 1, 1953 R. SPIETH 2,650,867
MOUNTING DEVICE FOR ANTIFRICTION BEARINGS
Filed June 28, 1950 2 Sheets-Sheet 1
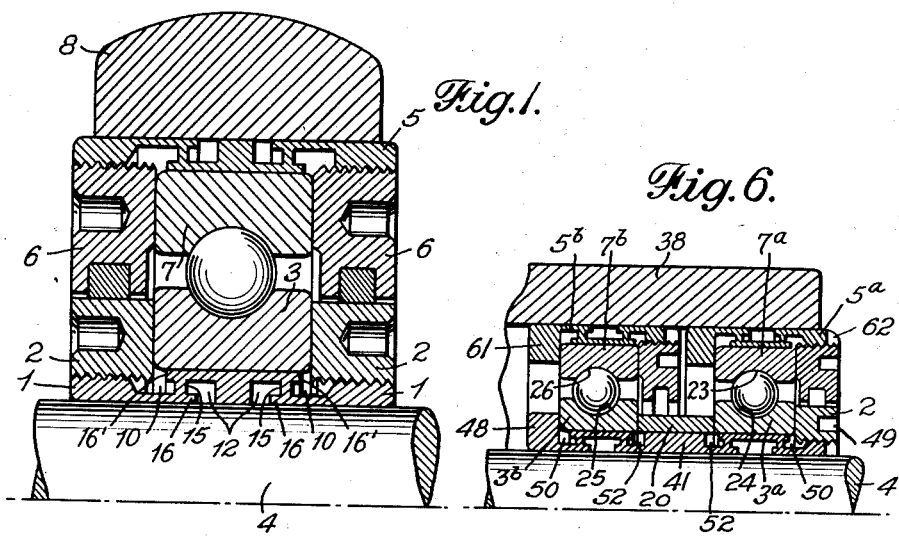
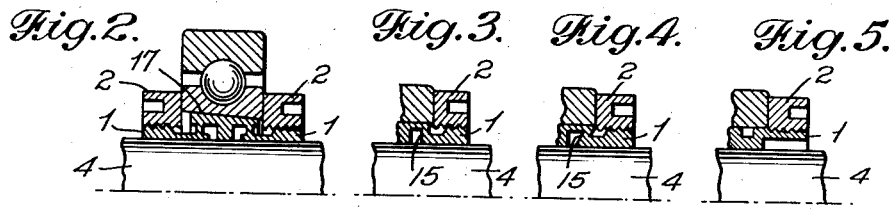
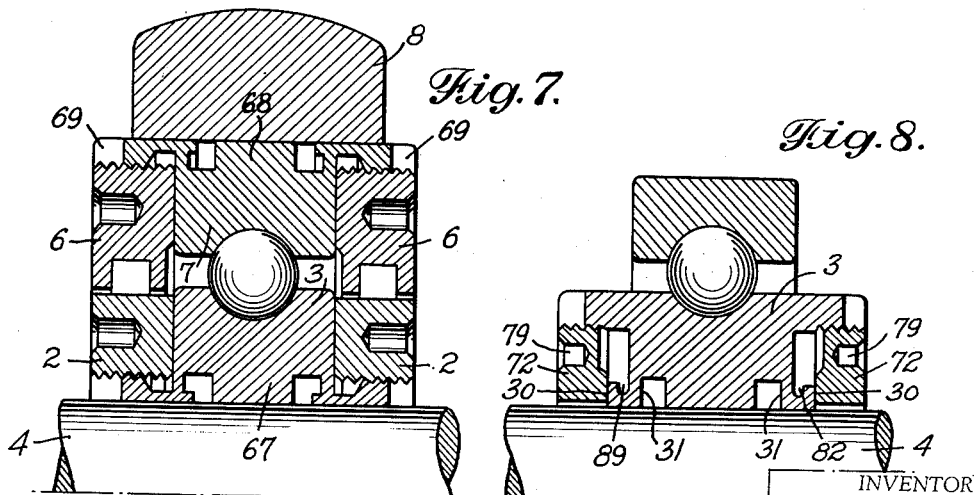
INVENTOR
Rudolf Spieth
BY Karl Michaelis
ATTORNEY

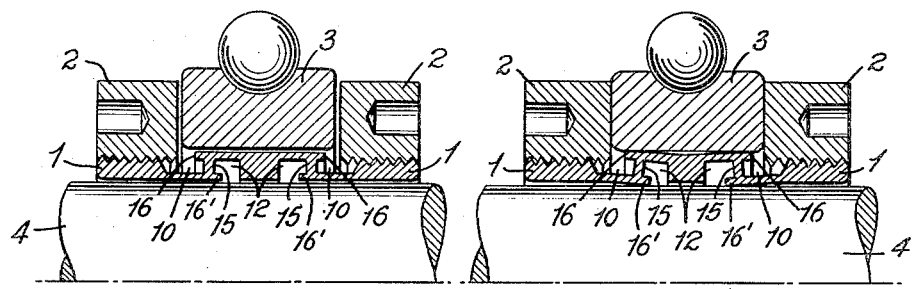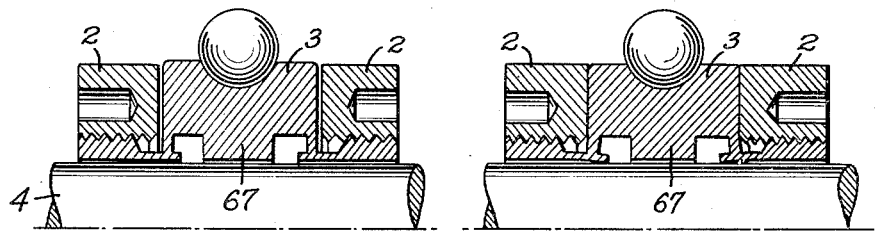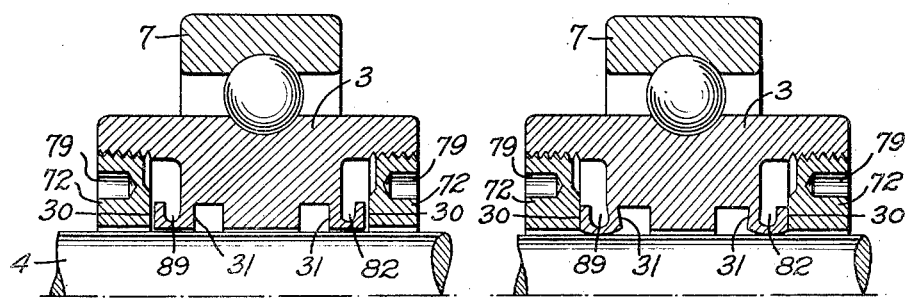

Patented Sept. 1, 1953

2,650,867

UNITED STATES PATENT OFFICE 2,650,867

MOUNTING DEVICE FOR ANTIFRICTION BEARINGS

Rudolf Spieth, Esslingen-Kennenburg, Germany

Application June 28, 1950, Serial No. 170,776
In Sweden June 30, 1949

4 Claims. (Cl. 308—236)

This invention relates to antifriction bearings (ball or roller bearings or the like) and more especially to the mounting of such bearings in place on a shaft or in a housing.

It is an object of this invention to facilitate and improve the mounting in place of antifriction bearings by providing means whereby this work can be done in less time, with greater ease and with superior effect as regards the accuracy and stability of the mount.

It is a further object of the invention to provide means for mounting antifriction bearings, which do not require more than a single tolerance.

As is well known to those skilled in the art, when mounting an antifriction bearing by fixing the inner ring in position on a shaft and/or the outer ring in a pedestal body, three different situations are to be considered. Either the shaft revolves while the body of the bearing is stationary, or the shaft is stationary and the bearing body revolves around the shaft. The third case is that of a shaft and bearing body revolving both in alternation.

In the first case, if the inner ring of the bearing is loosely mounted on the shaft, the load acting on the shaft will cause the ring to turn relative to the shaft. In the second case, if the outer bearing ring is seated loosely in the pedestal body, the ring will move within this body. In both cases the bearing surfaces will be injured, metal particles may enter the bearing and destroy it and in any case the life of the bearing will be short.

The revolving of a bearing ring can be avoided only by seating it on the shaft or in the bearing body so firmly as to exclude any play between the contacting surfaces.

In view of all these requirements the mounting and removal of the bearing, the material of which it is made and the wall thickness of the pedestal body require the admission of a number of tolerances which have been standardized internationally.

The mounting means according to the present invention enable antifriction bearings to be mounted in place and removed in a particularly simple and reliable manner while avoiding the drawbacks presented by all similar devices hitherto suggested. The new device according to this invention requires only the observation of a single tolerance applicable in every case regardless of the load acting on the bearing seat and on the bearing itself. It enables the bearing to be mounted in place or removed in the simplest manner and in the shortest possible time and it removes the danger of the bearing being destroyed.

The new device consists in a ring-shaped clamping sleeve made all in one piece and being either an independent body or forming part of the bearing rings. This sleeve is so designed as to be capable of yielding both in axial and radial direction to pressure or tension in such a manner that by tightening a nut or a threaded ring in the sense of an elongation or compression the clamping effect can be varied and controlled.

The new clamping sleeve is formed on both its inner and outer circumferential faces with relatively staggered grooves, whereby certain parts of the sleeve body are so reduced in thickness as to be able to yield to tension or pressure somewhat similar to the yielding capacity of joints. Owing to the provision of these resiliently deformable sleeve sections, the sleeve, when being acted upon by an axially directed force, is enabled to either expand outwardly in radial direction or narrow down in inward direction.

In the drawings affixed to this specification and forming part thereof, several embodiments of my invention are illustrated diagrammatically by way of example.

In the drawings:

Fig. 1 illustrates a ball bearing mounted in a pedestal or movable bearing body and embracing a shaft or axle, two clamping sleeves being provided for mounting the outer ring in the bearing body and the inner ring on the shaft or axle, both sleeves having the general form of cylindrical rings.

Fig. 2 illustrates the mounting of a ball bearing on a shaft or axle by means of a sleeve according to this invention, which has the form of a conical frustum.

Figs. 3, 4 and 5 illustrate different forms of clamping sleeves according to the invention.

Fig. 6 illustrates a bearing body open on one side only, in which two ball bearings are mounted side by side.

Fig. 7 shows sleeves according to the invention formed in one piece with the bearing rings, while Fig. 8 illustrates the combination of a clamping sleeve according to this invention as being formed in one piece with the inner ring only.

In all the Figures 1 to 8 the bearing body and the bearings and sleeves themselves are shown in cross-section.

Figs. 9 to 14 are schematic showings, in an exaggerated manner of the deformation the clamping sleeves according to this invention are able to undergo during operation of the bearing.

Figs. 9, 11 and 13 show the respective bearings at rest, while

Figs. 10, 12 and 14 show the deformation of the clamping sleeves.

Referring to the drawings and first to Fig. 1, 1 is the clamping sleeve serving to mount the inner bearing ring 3 on the shaft or axle 4.

5 is another clamping sleeve serving to fix the outer bearing ring 7 in position in the pedestal body 8. The clamping sleeve 1 constitutes a ring-shaped substantially cylindrical body formed with two outer grooves 10 opening toward the outer circumferential surface of the sleeve. 12 are two grooves formed in the inner circumferential sleeve face. The radial sections of the sleeve walls left between a groove 10 and a groove 12 are comparatively thin and correspondingly deformable under strain. Axially directed extensions 16 and 16' formed on the outer and inner circumferences of the sleeve serve for widening the supporting surfaces and rendering the clamping more elastic.

If the sleeves 1 and 5 are inserted between the shaft and the inner bearing ring and between the bearing box 8 and the outer bearing ring, respectively, and if now the nuts 2 or the threaded rings 6 are tightened, the action of the forces thereby generated will be transmitted through the thin joint-like radial sections 15 of the sleeves. Since these sections are staggered relative to each other, a bell crank effect will be generated between them, whereby the clamping sleeves will be deformed outwardly (Fig. 10). On the nuts and threaded rings being tightened the clamping sleeves will become wider in axial direction until their ring-shaped inner and outer surfaces will apply themselves simultaneously to the shaft or axial and the inner bearing ring and also to the bearing box and the outer bearing ring, and the two bearing rings will thus be clamped on and in their seats respectively. When the nuts and threaded rings are loosened, the clamping sleeves will at once release the shaft or axle, the bearing box and the two bearing rings.

Fig. 2 illustrates another form of the bearing according to the invention, in which a clamping sleeve formed with a conical outer surface 17 is applied to a similar conical bearing of the inner ring of the ball bearing.

In the clamping sleeves illustrated in Figs. 3 and 4 the extensions 16 of Fig. 1 are absent. In the modification of Fig. 3 the deformable sections 15 extend in radial direction, while in the modification of Fig. 4 they include an acute angle with the shaft or axle and with the bearing ring.

While in the modifications shown in Figs. 1 to 4 the tensional force generated by the nut 2 acts close to the shaft 4, in the modification of Fig. 5 it becomes active near the inner ring of the bearing, i. e. at the extreme end of the clamping sleeve.

In contrast to Fig. 1, Fig. 6 illustrates a housing 38 open on one side only, in which two ball bearings are mounted in axial juxtaposition. The inner clamping sleeve 41 supports both bearings, being formed with an outer flange 48 and with two outer grooves 50 and one inner groove 52 for the inner rings 3a and 3b of each bearing. A groove 49 serves for the holding up when tightening the nut 2. When this nut is tightened, the force generated thereby will be transmitted by way of the inner ring 3a of the first bearing and the intermediate ring section 20 to the inner ring 3b of the second bearing and through it to the flange 48. On further tightening the nut 2, the clamping sleeve will become longer in axial direction until the two inner rings 3a and 3b are firmly mounted on the shaft or axle 4. The two outer rings 7a and 7b are acted upon by separate clamping sleeves 5a and 5b respectively, each of them being formed with a supporting flange 61 and a notch 62 for the holding up, when the threaded rings are being tightened to firmly seat the outer rings in the housing 38. The separate clamping of the two outer rings 7a and 7b offers the advantage that the clamping sleeve 5a projecting through from the housing 38 can be the last to be clamped and can be so shifted axially that any play of the balls in the races 23, 24, 25 and 26 is avoided altogether. In the same manner, after the bearings have been in operation for some time, a subsequent adjustment can be effected in both axial directions and the well known time-consuming adaptation of spacing rings can be dispensed with.

Instead of the construction shown in Fig. 6, the outer clamping sleeves for the two bearings may be made in one piece, while two inner clamping sleeves may be provided. Alternately both the inner and the outer clamping sleeves may be made in one piece. This offers for the first time the possibility of releasing the shaft of the housing within a few seconds without lessening the tight position of the two bearings or losing any lubricant.

Fig. 7 illustrates that form of the invention, in which the clamping sleeves form part of the two bearing rings. Here the two sleeves are formed with outer notches 69 for holding up when tightening the nuts or threaded rings. The outer end faces and the ring-shaped extensions are formed similarly as shown in the clamping sleeves 1 and 5 of Fig. 1. In bearings of a certain width the middle sections 67 and 68 are preferably retained for reinforcement, but in the case of narrow bearings might also be dispensed with.

The mode of tightening the sleeves on the shaft and in the bearing box is similar to that described with reference to Fig. 1, however here the inner bearing ring, being considerably reinforced in outward direction is merely narrowed down in the boring and the outer bearing ring, being reinforced inwardly, is only extended near its outer diameter, while the bearing rings 3 and 7 are directly connected with the shaft 4 and housing 8, respectively, while the tightening must be carried through separately on both sides by means of the nuts 2 and threaded rings 6.

When running under lesser load, the bearing rings 3 and 7 formed as clamping sleeves may also be formed as such sleeves only on one side.

In contrast to all the other figures, Fig. 8 illustrates the case of a ball bearing, in which the inner bearing ring can be fixed on the shaft or axle with a load acting on it. If the shaft 4 is mounted in the boring of the bearing ring 3 and the threaded rings 72 are tightened on the left and right hand sides, notches 79 being provided for holding up, the boring will be narrowed down by way of the deformable sections 31 formed next to the grooves 82 and 89, so that the shaft 4 is fixed in the bearing. The pressure surface 30 is widened to ensure a satisfactory mounting of the threaded rings.

Similarly to the inner ring of the bearing, the outer ring may also be formed as a clamping sleeve.

The Figs. 9 and 10 illustrate the form and behaviour of the combination of Fig. 1 before and after clamping. Figs. 11, 12 and Figs. 13, 14 illustrate the same two phases for the combinations of Fig. 7 and Fig. 8, respectively.

As shown in the foregoing description of the invention, the bearing mounting means according to the invention avoid all the drawbacks of the mounting means hitherto suggested in the simplest and most reliable way.

Obviously the deformable joint-like sections of the clamping sleeves may be of the same or different thickness and spaced relatively in the same or a different manner, whereby a far-reaching adaptation of the clamping sleeves to particular conditions is rendered possible.

I wish it to be understood that I do not desire to be limited to the details shown and described for obvious mdoifications will occur to a person skilled in the art.

I claim:

1. Mounting sleeve for antifriction bearings comprising in combination, a metallic clamping sleeve formed at each end thereof with at least one pair of adjacent ring grooves, one groove open towards the outer and another groove open towards the inner circumferential sleeve surface to form a thin annular section therebetween, an axially large, mechanically resistive supporting section extending into the gap between the two inwardly opening grooves, the relatively thin annular sections of the sleeve body separating the outwardly and the inwardly open grooves being weak enough to be resiliently deformable by an axially acting force, and means in contact with both end faces of the sleeve for generating such deforming forces.

2. The device of claim 1, in which the means for generating deforming forces is a nut surrounding the end sections of the sleeve.

3. The device of claim 1, in which the means for generating deforming forces is a threaded ring surrounding the end sections of the sleeve.

4. The device of claim 1, in which the sleeve sections adjoining the annular grooves are integral with the antifriction bearing rings.

RUDOLF SPIETH.

References Cited in the file of this patent

UNITED STATES PATENTS

| Number | Name | Date |
|---|---|---|
| 2,495,409 | Costello | Jan. 24, 1950 |

FOREIGN PATENTS

| Number | Country | Date |
|---|---|---|
| 62,024 | Denmark | Mar. 13, 1944 |